United States Patent [19]

Daberkow et al.

[11] Patent Number: 4,872,111
[45] Date of Patent: Oct. 3, 1989

[54] MONOLITHIC SEMI-CUSTOM IC HAVING STANDARD LSI SECTIONS AND COUPLING GATE ARRAY SECTIONS

[75] Inventors: Kevin L. Daberkow, San Jose; Christopher D. Finan, Santa Clara; Joseph A. Petolino, Palo Alto, all of Calif.; Daniel Carl Sobottka, Chicago, Ill.; Jeffrey A. Thomas, Cupertino, Calif.

[73] Assignee: Amdahl Corporation, Sunnyvale, Calif.

[21] Appl. No.: 233,953

[22] Filed: Aug. 18, 1988

Related U.S. Application Data

[63] Continuation of Ser. No. 900,640, Aug. 27, 1986, abandoned.

[51] Int. Cl.$^4$ .......................... G06F 13/00; G06F 7/00
[52] U.S. Cl. .................................... 364/200; 364/434; 364/243.41; 364/231.8
[58] Field of Search ............................... 364/200, 900

[56] References Cited

U.S. PATENT DOCUMENTS

| | | | |
|---|---|---|---|
| 4,020,466 | 4/1977 | Cordi et al. | 364/200 |
| 4,161,778 | 7/1979 | Getson et al. | 364/900 |
| 4,349,871 | 9/1982 | Lary | 364/200 |
| 4,394,732 | 7/1983 | Swenson | 364/200 |
| 4,442,487 | 4/1984 | Fletcher et al. | 364/200 |
| 4,484,303 | 11/1984 | Provanzano et al. | 364/900 |
| 4,607,346 | 8/1986 | Hill | 364/900 |
| 4,620,275 | 10/1986 | Wallach et al. | 364/200 |
| 4,648,044 | 3/1987 | Hardy et al. | 364/900 |
| 4,669,043 | 5/1987 | Kaplinsky | 364/200 |

*Primary Examiner*—David Y. Eng
*Attorney, Agent, or Firm*—Fliesler, Dubb, Meyer & Lovejoy

[57] ABSTRACT

In a data processing system including a pipelined instruction execution unit and a pipelined high speed cache, a storage queue consisting of a set of FIFO registers and associated support logic handles transfer of data from the pipeline instruction execution unit to the high speed cache. When a store request flow from the instruction execution pipeline is forwarded to the high speed cache, instead of placing the data directly into the high speed cache, the starting address, length of store and data to be stored are placed into one of the store queue registers. The instruction execution unit sees the store request as completed and continues processing even though data has not been physically placed in the high speed cache. The write to the high speed cache is finished in the background at a later time during an unused storage pipeline cycle in the high speed cache.

12 Claims, 6 Drawing Sheets

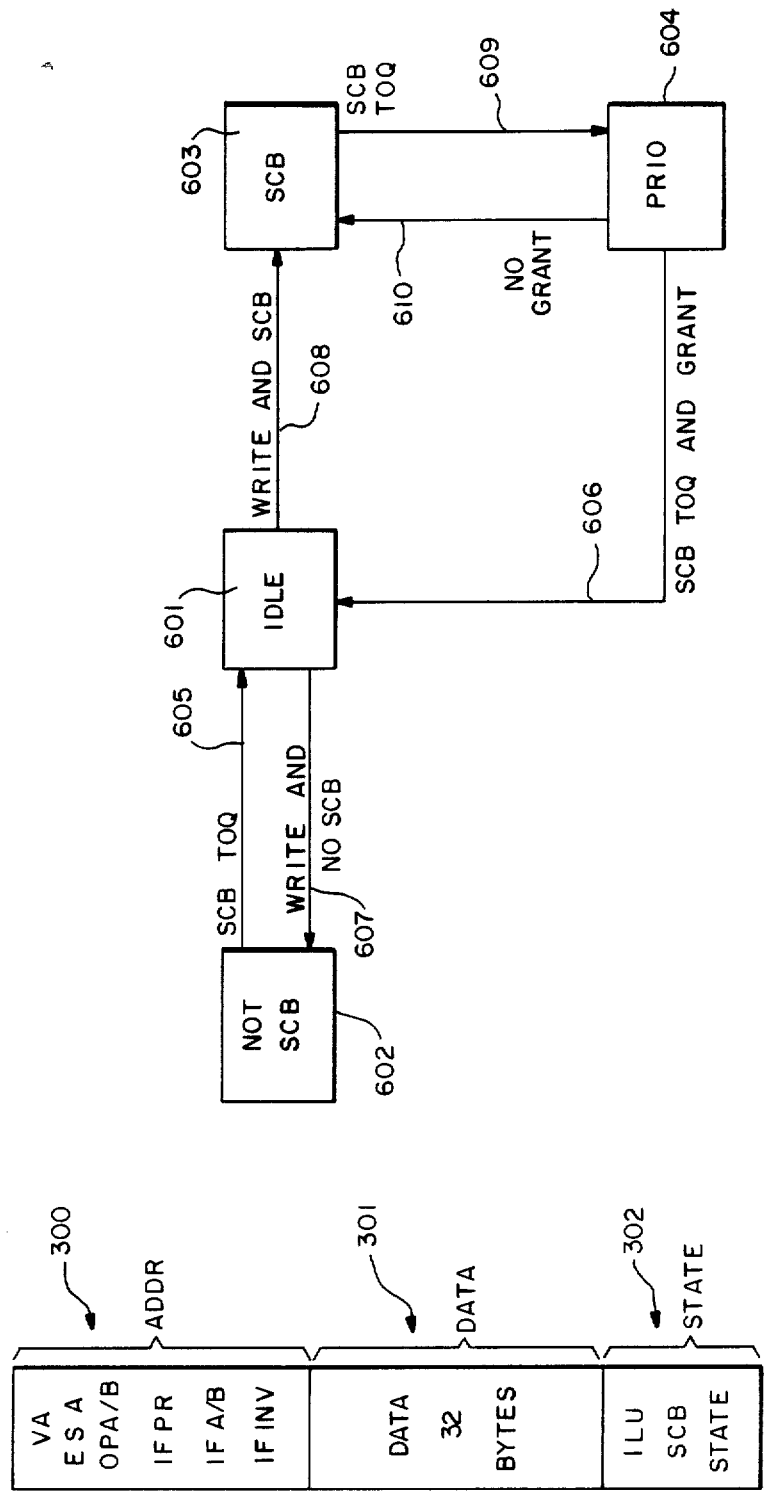

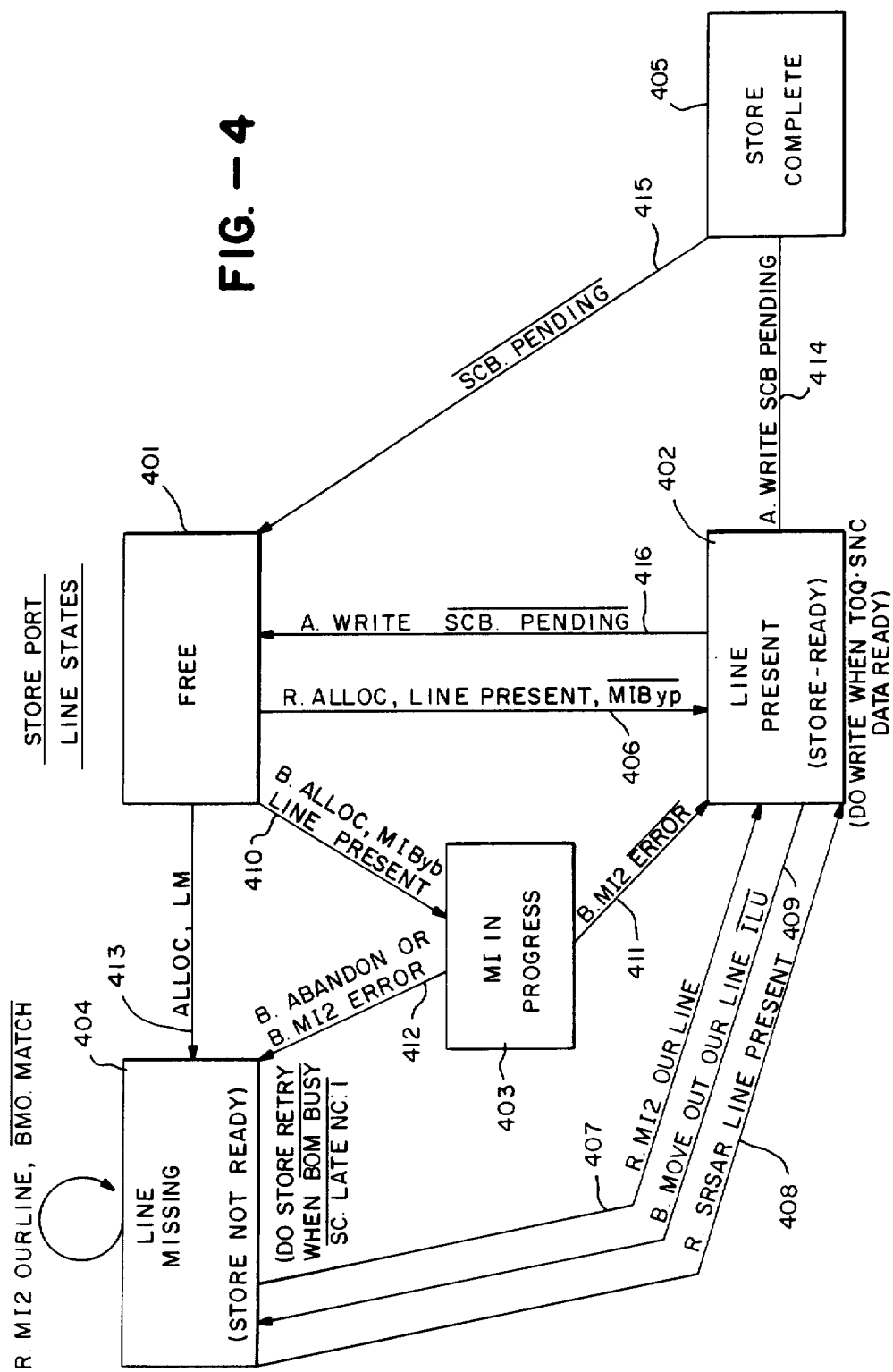

(4,872,111)

MONOLITHIC SEMI-CUSTOM IC HAVING STANDARD LSI SECTIONS AND COUPLING GATE ARRAY SECTIONS

This is a Continuation of Ser. No. 06/900,640, filed 08/27/86, now abandoned.

FIELD OF THE INVENTION

The present invention relates to the transfer of data in a data processing machine between a unit executing instructions in a pipeline and a high speed cache or similar storage device operating according to an independent pipeline.

BACKGROUND OF THE INVENTION

High speed data processing machines typically include an instruction unit that organizes a flow of instructions in a pipeline fashion and an execution unit interlocked with the instruction unit pipeline for executing the instructions. Results from the execution of instructions are posted in a result register during a step of the instruction unit pipeline. Before the pipeline can continue with following instructions, the results posted in the result register must be stored to free the result register.

The results are typically loaded from the result register into a storage facility that includes a high speed cache. The high speed cache allows the results to be quickly loaded from the result register into the cache, freeing the instruction unit pipeline to continue with following instructions.

The storage facility also services other sources of data and runs according to a separate pipeline flow. In prior designs, the flow of the storage unit pipeline for storing results from the result register is required to be a high priority flow to avoid causing excessive delay in the instruction unit pipeline. Such high priority flows "bump" requests for the storage unit pipeline from other sources. Consequently, a cache contention problem arises.

Prior art systems couple the result register directly to the cache, so the results have to be held in the result register until the store operation is successful. If the line to which the results are to be stored is not present in the cache, the instruction unit pipeline would wait until the storage facility brings the line in from main storage. In this situation, the instruction unit pipeline comes to a halt, causing a degradation in performance.

A further performance bottleneck of prior systems occurs because a result register is typically small compared to the size of a line of data in the cache. So performance is degraded for long writes to a line in the cache involving several small increments of data, each requiring a separate flow of the storage unit pipeline.

Accordingly, there is a need for a system that reduces the cache contention and performance problems of prior designs.

SUMMARY OF THE INVENTION

The present invention provides an apparatus for transferring data from a result register into a high speed cache that leads to a significant performance enhancement over prior designs and reduces cache contention.

In a pipeline data processing machine having a first unit for execution of instructions running according to a first pipeline and a second unit for storing data from a plurality of ports running according to a second pipeline, the first unit having a result register for holding results of a flow of the first pipeline and means for supplying address information for the results, the present invention provides an apparatus for transferring results in the result register to the second unit. The invention comprises a plurality of store queue registers in communication with the result register, each of the plurality of registers including means for storing the result and address information from at least one flow of the first pipeline and means for storing control information. Further, control means, in communication with the second unit and the plurality of registers responsive to the control information and a flow of the second pipeline, is included for selecting one of the plurality of registers as a port to the second unit and for updating the control information in the plurality of registers.

In one aspect of the invention, the plurality of registers is organized as a storage queue that is controlled in a first-in, first-out basis for supplying the data in the respective register as a port to the storage unit pipeline. The storage unit pipeline includes a means in communication with the control means for the plurality of registers that is enabled to select the store queue register at the top of the queue or data from other ports to the storage unit for a given flow of the storage unit pipeline.

Other objects, features and advantages of the present invention will become apparent upon consideration of the following detailed description and the accompanying drawings.

BRIEF DESCRIPTION OF THE DRAWINGS

FIG. 3 illustrates the contents of the registers in the storage queue.

FIG. 4 is a state diagram illustrating storage queue control.

FIG. 6 is a state diagram illustrating a set change bit operation of the main store controller associated with the storage queue control.

DETAILED DESCRIPTION OF THE INVENTION

With reference to the figures, a detailed description of the present invention is provided. First, with reference to FIG. 1, an overview of the invention is described. With reference to FIGS. 2A and 2B and FIGS. 3–6, a preferred embodiment of the present invention is described.

A. Overview

Figure 1:
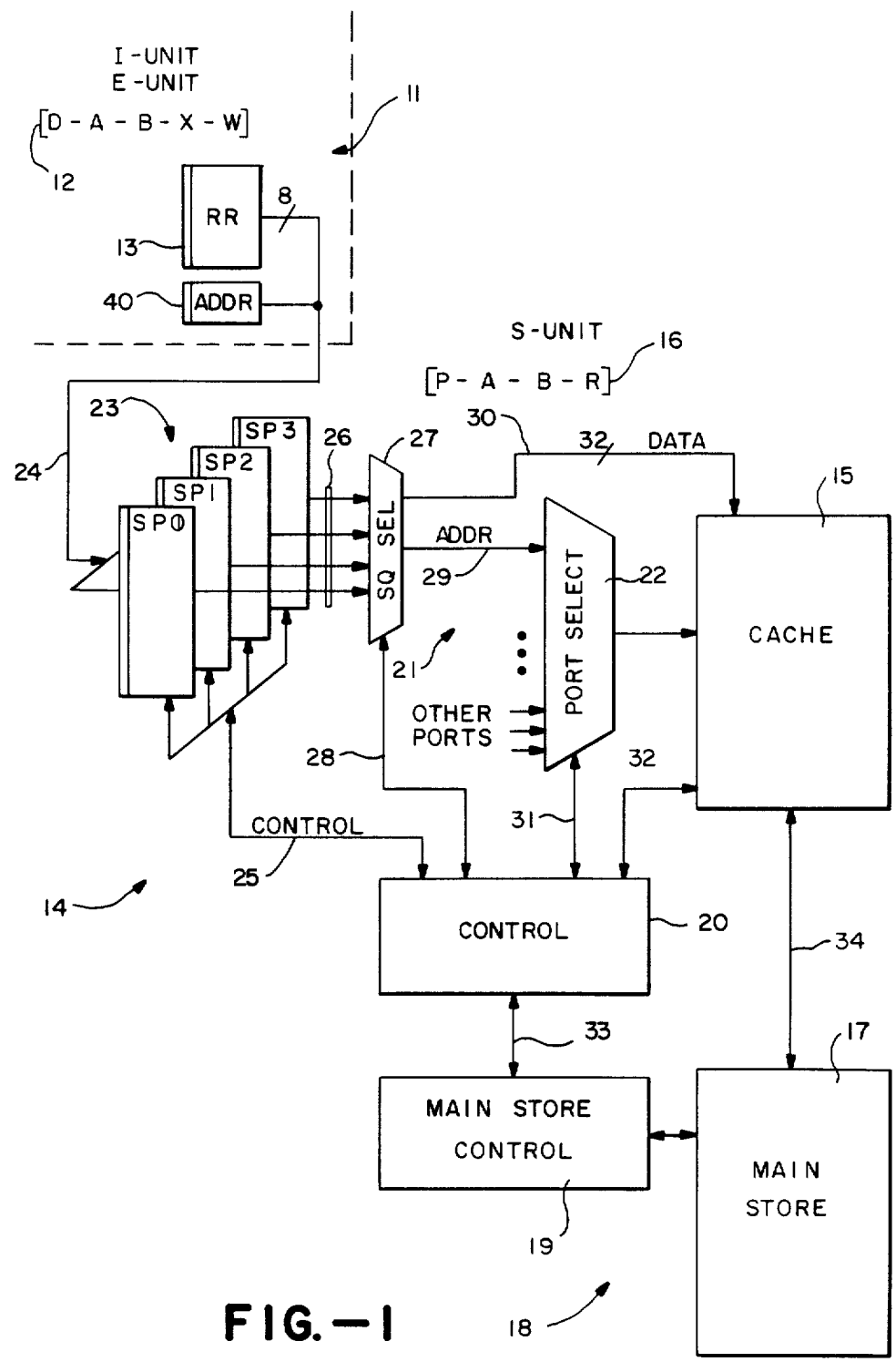
FIG. 1 is an overview block diagram of the present invention.

FIG. 1 illustrates a portion of a data processing machine with which the present invention is used. The machine includes a first unit 11 for executing instructions. The first unit 11 is typically made up of an instruction unit I-UNIT that organizes a flow of instructions according to an instruction unit pipeline 12 designated by [D-A-B-X-W], where each letter within the brackets represents a stage in the instruction unit pipeline. The unit for executing instructions also includes typically an execution unit E-UNIT that executes the instructions provided by a flow of the instruction unit pipeline 12. Typically, in the X stage, the execution unit performs operations designated by an instruction in the instruction unit pipeline 12. The results of the operation are posted in a result register 13. The instruction unit includes a means 40 for supplying address information for storing the results.

The data processing machine also includes a second unit 14 for storing data including the results from the result register 13. The second unit 14 includes a storage unit S-UNIT having a high speed cache 15. The storage unit operates according to a storage unit pipeline 16 designated [P-A-B-R], where each letter within the brackets represents a stage of the storage unit pipeline 16. For each flow of the storage unit pipeline 16, an operation can be performed on data in the high speed cache 15, such as fetching data from the cache to the instruction unit or execution unit, writing data to the cache from the result register 13 or transferring data from the cache to a main storage facility 17.

As illustrated in FIG. 1, the second unit 14 also includes a main storage facility 18 which includes a main store 17 for storing a volume of data for use by the data processing machine and a main storage control 19. The operation of the main storage control 19 as it pertains to the present invention is described in more detail with reference to the preferred embodiment.

The storage unit S-UNIT, in addition to the high speed cache 15, includes means 20 for controlling the storage unit S-UNIT.

The storage unit receives addresses from a plurality of ports 21. A means 22 for selecting one of the plurality of ports 21 for a given flow through the S-UNIT pipeline 16 involving an access to the high speed cache 15 is also included.

The present invention is characterized by a plurality of store queue registers 23, designated store ports SP0, SP1, SP2 and SP3. The plurality of registers 23 is coupled to receive the results from the result register 13 and associated address information from the I-UNIT as shown at line 24. The plurality of registers 23 communicate with the control means 20 across line 25. The control means 20 operates the plurality of registers 23 according to a first-in, first-out algorithm. Results from each of the plurality of registers 23 are supplied over lines 26 to a store queue selector 27 which is responsive over line 28 to the control means 20 for selecting one of the plurality of registers 23 as a port to the port selecting means 22 across line 29. The data from the results is supplied over line 30 directly to the high speed cache 15 and loaded under control of the control means 20 in the high speed cache when the address information from line 29 is selected as a port for a flow of the storage unit pipeline 16.

As shown in FIG. 1, the size of the result register 13 for storage of data is 8 bytes. Each of the store ports is a multiple of the size of the result register 13. In the embodiment shown, the data supplied through each of the store ports SP0-SP3 is 32 bytes wide, as shown on line 30. Thus several flows of the 8 byte results, up to four, from instruction unit pipeline 12 can be loaded into a single store port.

The control means 20 communicates with the port selector 22 across line 31 and with the high speed cache across line 32. Further, the control means 20 communicates with the main store control 19 across line 33. Data flows between the high speed cache 15 in the main store across line 34.

The control means 20 operates the plurality of store queue registers 23 according to three basic states: free, data-not-ready and data-ready. For each flow of the instruction unit pipeline 12 that desires to store results from the result register 13 into one of the plurality of store queue registers 23, the control means 20 selects a particular store port for use. A store port in a free state is currently not in use by any request. A store port in a data-not-ready state has been allocated to a store request but has yet to complete the transfer of data from the result register. A store port in a data-ready state has completed the transfer of data from the result register to the store port register and is waiting to be selected by the port selecting means 22 for selection through the storage unit pipeline 16 for a write into the high speed cache 15.

The control means 20, as described in more detail below, includes means for preventing fetches initiated by one of the other ports in the plurality of ports 21 from lines in the high speed cache 15 for which a store port contains data to be written. This situation is termed a "store fetch interlock". The control means 20 must account for the situation to prevent a fetch of a line from the cache that may be modified by data residing in one of the plurality of store queue registers 23 until the modifying data has been written to the line from the store port, assuring a current version of the line is fetched from the cache 15.

In addition, the control means 20, as described in more detail below, includes a means for notifying the main storage facility 18 that data from the storage queue has been written to a line in the cache resulting in a modification. This operation is termed the "set change bit operation" because the main storage facility 18 includes a control bit indicating for each page whether the data in the page has been changed in the cache, marking the page in the main store 17 as modified.

The control means 20, as described in more detail below, further includes a means for detecting when data in one of the plurality of store queue registers 23 includes an address to a line that is missing from the cache 15. In this event, the control means 20 notifies the main store control 19 in the main storage facility 18 to move in the line from the main store 17 to the high speed cache 15. After the line is moved in to the high speed cache 15 from the main store 17, the control means 20 operates to retry the storage process for the store port awaiting the move-in.

B. Preferred Implementation

Figure 2A:
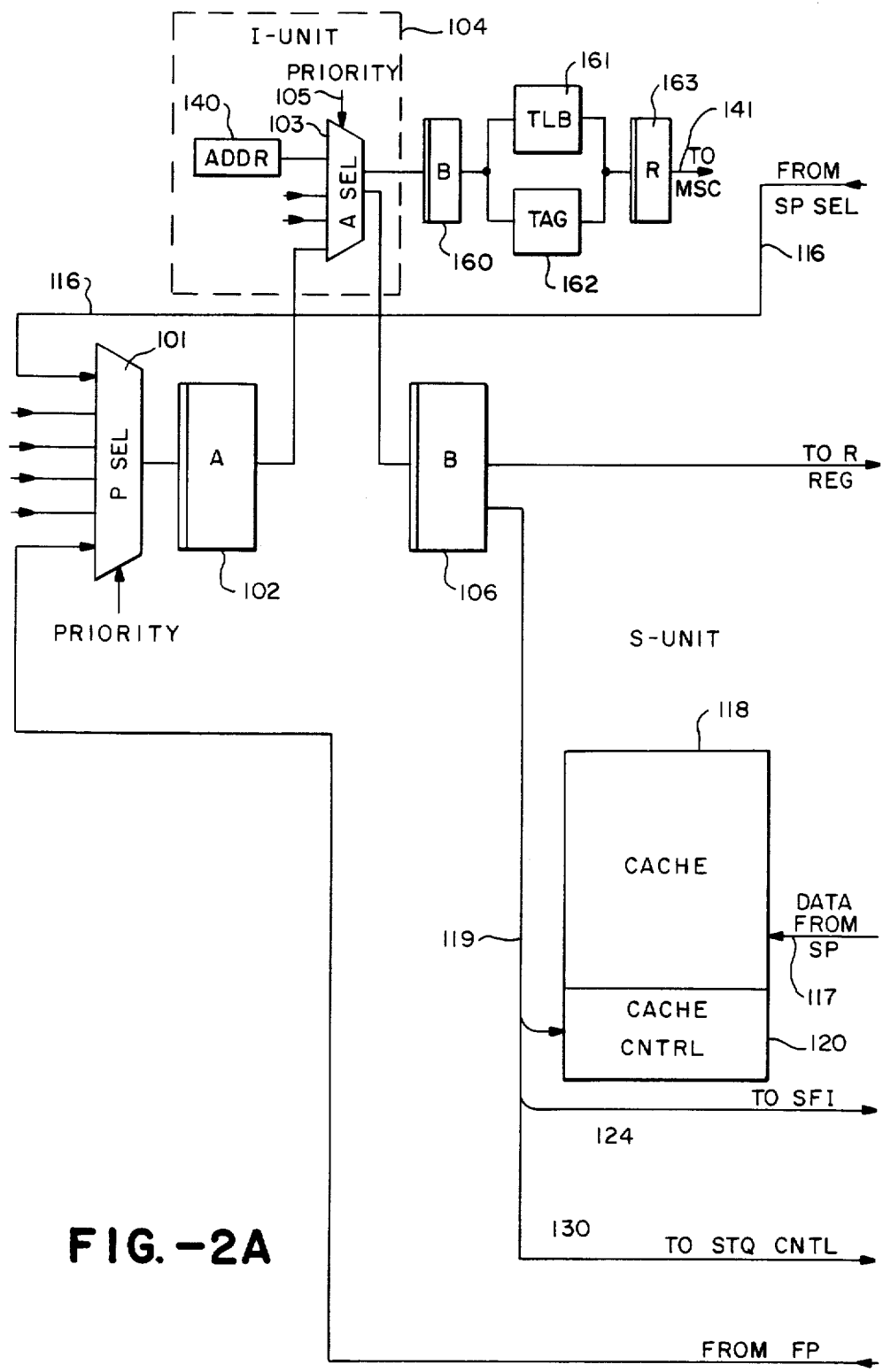
FIGS. 2A and 2B together make up a more detailed block diagram of a preferred embodiment of the present invention.
Figure 2B:
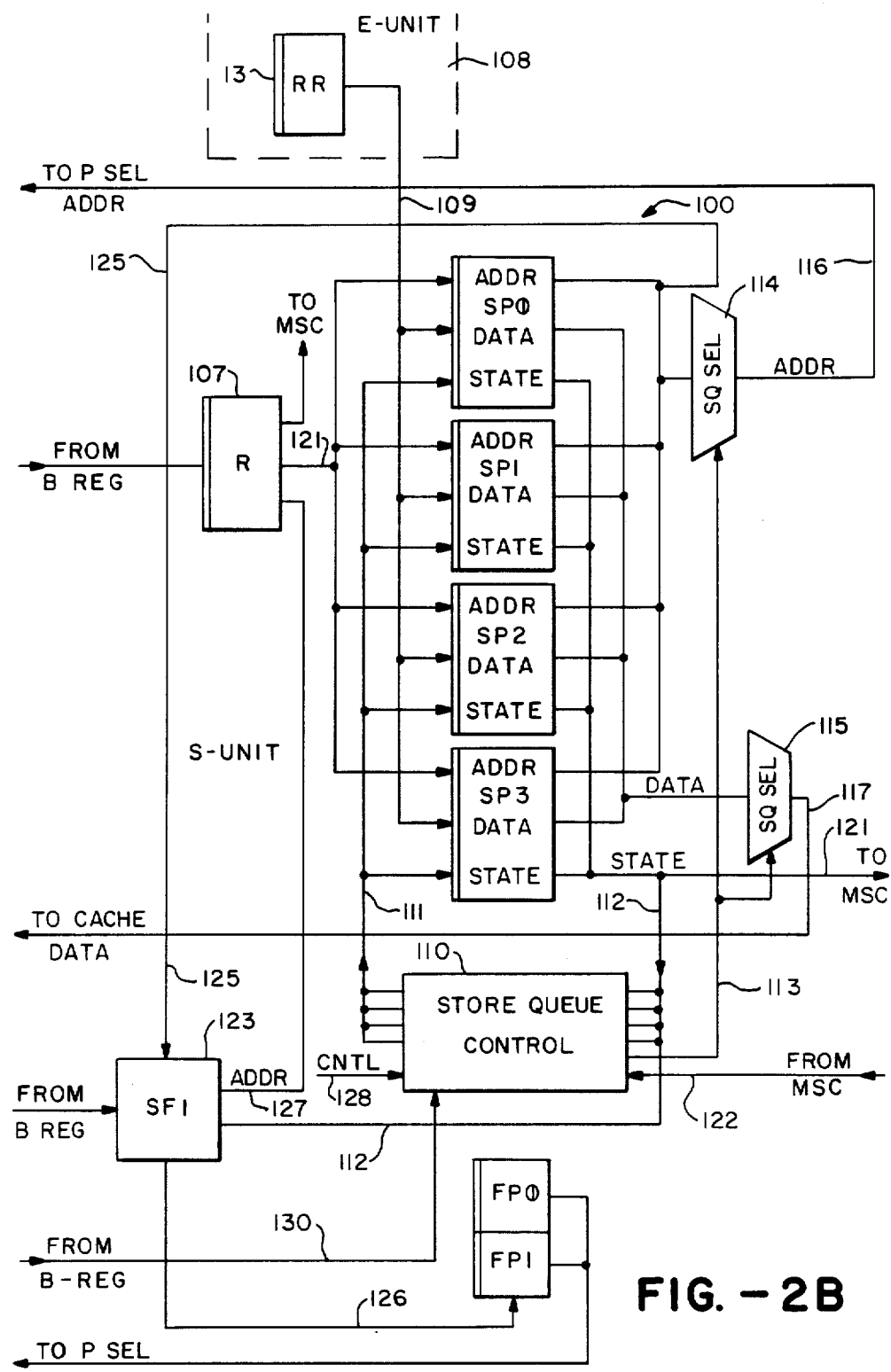

FIGS. 2A and 2B illustrate a preferred implementation of the store queue, designated generally 100, of the present invention and its relationship to the S-UNIT pipeline 16 (FIG. 1).

1. Address and Data Paths

As shown in FIG. 1, the storage unit pipeline includes a P-stage, A-stage, B-stage and R-stage. For the purpose of illustration of the pipeline, FIGS. 2A and 2B have been drawn to emphasize these pipeline stages. The P-cycle registers include the store ports SP0, SP1, SP2 and SP3, fetch ports FP0 and FP1 and other registers not shown. Data from the P-cycle registers are selected through the P-cycle selecting means 101 into A-stage registers 102. The A-stage registers 102 provide data through an A-cycle selector 103 located in the instruction unit 104 according to a priority control generated by the instruction unit 104 across line 105. The selected data is loaded into a B-stage register 106. Data in B-stage registers 106 are used for a cache access, after which R-stage registers 107 are loaded.

The A-cycle selector 103 in the instruction unit 104 also supplies the selected address to an storage unit (S-UNIT) B-cycle register 160. The address in the B-cycle register 160 is used to access a translation lookaside buffer 161 and a cache tag 162 to verify the presence of the addressed data in the cache 118 and to supply a system address to an S-UNIT R-cycle register 163. The system address is supplied on line 141 to a main store controller MSC.

The pipeline in the instruction and execution units is not illustrated in FIGS. 2A and 2B. However, the result register 13 is shown residing in the execution unit 108. Results posted in the result register 13 are supplied over line 109 to the store queue 100.

Address information for the results is supplied through a register 140 in the I-UNIT pipeline to the A-cycle selector 103, through which it is staged through the S-UNIT pipeline B- and R-stages to an allocated store port SP0-SP3. In the preferred implementation, a logical address is used for cache accesses that is translated into a system address for main store accesses as mentioned above. The system address is supplied over line 141 to the main store controller MSC for use in set change bit and move-in operations.

In the implementation shown in FIGS. 2A and 2B, there are four store ports SP0, SP1, SP2 and SP3, each storing address information for the results stored in the respective port, the result data itself and state information for the respective port. The contents of each port is set out in detail in FIG. 3, discussed below.

The implementation includes a store queue control means 110 for generating and updating the state information across lines 111 and 112. In addition, the store queue control means 110 operates to generate a top-of-queue pointer across line 113 for supply to the store queue selectors 114 and 115. The store queue selectors 114 and 115 operate to select the address information and data, respectively, from the store port indicated by the top-of-queue pointer on line 113. The top-of-queue pointer is generated in the store queue control means 110 in response to the state information and a flow of the storage unit pipeline.

The address information selected by the store queue selector 114 is supplied over line 116 as one input to the P-cycle selecting means 101. The data selected by the store queue selector 115 is supplied over line 117 directly to the high speed cache 118. The storage unit control (not shown) generates a priority signal from which the P-cycle selector 101 may select the address information on line 116 from the store queue selector before loading into the A-stage register 102. The A-cycle selector 103 may then select the address information from the A-stage register 102 for loading into the B-stage register 106. The address information in the B-stage register 106 is supplied on line 119 to the cache controller 120 which, responsive to the address information on line 119, enables the cache to load the data from line 117. Information from the B-stage registers 106 is loaded into the R-stage registers indicating the results of the cache access occurring after the B-stage.

The state information stored in the store ports is supplied over line 121 to the main storage controller for use in the line not present and set change bit operations mentioned above. In addition, control information from the main storage controller comes in on line 122 to the store queue controller.

The preferred implementation in addition includes means 123 for detecting a storage fetch interlock. The means 123 for detecting a storage fetch interlock receives address bits across line 124 from the B-stage registers 106 of a fetch flow over the storage unit pipe. These address bits are compared with the address data from all valid (4 max) store ports supplied across line 125 and the address in the R-cycle register 127. In the event that there is a match, the fetch port FP0, FP1 is signalled across line 126 of the interlock situation and the fetch from the cache is disabled. The means 123 signals the S-UNIT controller to assign a higher priority to the storing of data in the storage ports at the P-cycle selector 101 to speed up the unloading of the data causing the storage fetch interlock into the cache 118.

Information in the B-stage registers indicating a successful store of store port data is also supplied to the store queue control means 110 across line 130. The store queue control means 110 responds to this information by updating the top-of-queue state of each of the store ports and updating the state information in the store port from which the data was successfully stored. The store port(s) transition to the store complete state following their cache write flow. The store fetch interlock is then released in the fetch ports FP0, FP1 by a signal across line 126.

2. Store Port Contents

FIG. 3 illustrates the contents of a store port register. The address information 300 in a store port includes virtual address bits VA which identify the effective address in the cache of the first byte of data to be stored. In addition, it includes ending store address bits ESA that identify the address of the last byte of data stored in the data section 301 of the store port. The address information further includes data indicating the format of the store into the cache; the cache in the preferred embodiment including an operand and an instruction fetch cache which are organized into A and B associativities. Thus the address information includes an operand A/B associativity bit OPA/B specifying the associativity of the operand cache into which the data is to be stored. In addition, the address information includes an IFetch Pair bit IFPR which specifies that the line in the cache to which the request is being made is an "IFetch Pair". This means that the line can be found valid in both the instruction fetch and operand caches. In addition, the address information includes an IFetch A/B associativity bit IFA/B which specifies the associativity of the instruction fetch cache which contains the line of the request. Finally, the address information includes an invalidate IFetch entry bit IFINV signifying that the entry in the instruction fetch cache will be invalidated when the store request by the store port is complete.

The data information 301 includes up to 32 contingent bytes of data received from one or more flows from an 8 byte result register.

The state information includes an interlocked update bit ILU signifying that the store is an interlocked update which signifies that a line in the cache must not be moved out until the store from the store port has been completed. In addition, the state information includes a change bit pending bit SCB signifying that the main storage controller must set the change bit in the corresponding page out in the main store. The store port cannot be freed until the main store controller has set the change bit and informs the store queue controller that it has done so.

The state information includes additional state information that identifies the top of the store port queue.

3. Store Port Control

FIG. 4 shows a state diagram for the store port as maintained by the store queue controller 110 and cache controller 120. The state diagram shows a free state 401, a line present state 402 (corresponding to store-ready), a move-in in progress state 403, a line missing state 404 (corresponding to store-not-ready) and a store complete state 405.

The free state 401 indicates that the store port contains no data requesting access to the cache. This state is entered typically during the B-stage after an A-stage store port write flow of the data in the store port to the high speed cache (A.write, $\overline{\text{SCBending}}/$ ; 416). The free state can also be entered by transition from the store complete state 405 when the request no longer has a set change bit pending ($\overline{\text{SCBending}}/$ ; 415). A port must not go free until all previous store requests have completed and their associative ports have gone free in a first-in, first-out control sequence. A store port leaves this state upon being allocated to a new store request when address information is loaded to the store port from the R-stage cycle.

The line present state 402 indicates that the line to be written is available in the cache. If the line is in the operand cache, to be available it must be private. The line must be located at a location in the cache indicated by the A/B bit for the operand OPA/B or IFetch IFA/B caches and the effective address bits VA held in the store port. The line present state 402 may be entered in the R+1-stage of an allocating fetch request whose line is present in the cache when there is no move-in bypass operation occurring (R.alloc, line present, $\overline{\text{MIByp}}$; 406). In addition, the line present state 402 may be entered from the line missing state 404 in response to a move-in. This state is entered no earlier than the R+1 stage of the move-in two flow (long move-ins requiring two pipeline flows) (R.MI2, our line; 407). Each move-in two flow loads the proper value of effective address bits and associativity bits into all store ports which have address matching the move-in line. The line present state may also be entered from the line missing state in the R+1-stage of a system address return flow supplying the system address from the main store controller which found the line present in the cache (R.SRSAR, line present; 408).

The line present state 402 can transition to the line missing state 404 in the R-stage of a first move-out flow in which the B-stage address information matches the line in the store port and no interlocked update is indicated (B.MoveOut, our line, $\overline{\text{ILU}}$; 409). If an interlocked update is occurring, the move-out is aborted by the cache controller and the line present state remains.

The move-in in progress state indicates that a move-in of the subject line was in progress at the time the store port was allocated to the request. The move-in in progress state is entered upon R-stage allocation when the B-stage of the fetch flow sees a line present due to a move-in bypass condition (R.alloc, MIByp, line present; 410). The state 403 transitions to a line present state 402 after the next B-stage of the move-in two flow when no error occurs (B.MI2, $\overline{\text{error}}$; 411), or to a line missing state 404 on an abandon of the move-in in the B-stage or upon occurrence of an error in the B-stage of the move-in flow (B.abandon or B.MI2, error; 412). Transitions out of the move-in in progress state 403 are delayed until the B-stage in order to allow a move-in two flow with an uncorrected main store error to force the store port into a line missing state.

The line missing state 404 indicates that the subject line is or may be missing from the cache or that the line is public preventing writes to the line. This state is entered upon allocation of the store port if the line is not present (alloc, LM; 413). Also, the line missing state can be entered from the line present state, as mentioned above in the R-stage of a move-out flow when there is no interlocked update (409). The store port leaves the line missing state 404 for the line present state on a successful move-in or a system address return of its corresponding line (407, 408).

The main store controller MSC (which has the only copy of a store port's system address) checks every move-in request against the system addresses of all store ports in line missing state. Cache and store queue controllers 110, 120 identify to the main store controller which store ports are line missing. The main store controller asserts a move-in-match mask during the A-cycle of the move-in's MI2 flow. This causes each indicated store port to transition from line missing 404 to line present 402 state. Because of the variable amount of latency between the time the cache controller 120 tells main store controller MSC which ports are line missing and the time cache controller 120 receives the move-in-match signals, store queue control must guarantee that a store port cannot be freed and re-allocated during this latency period.

The store complete state 405 indicates that a store request has completed from the cache controller's point of view but the main store controller has a pending set change bit operation which requires that the store port not be reallocated. This state is entered no earlier than the B-stage of the write flow when the state information indicates a set change bit pending (A-write, SCB pending; 414). The store complete state 405 transitions to the free state 401 upon completion of the set change bit operation ($\overline{\text{SCBending}}/$ ; 415).

A write of data from the line present state 402 of a store port is carried out when the given store port is in a line present state at the top of the queue, the store is not complete and the data is ready for loading into the cache (TOQ, SNC, Data Ready).

The store queue also can assume a set change bit pending state, an interlocked update state and a suppressed state. The set change bit pending state indicates that the main store controller needs to set the corresponding change bit in the main store system. The state is entered upon entry to the line present or move-in in progress states 402, 403 if the change bit found in the cache line's copy of the storage key that contains the change bits is 0 and the store is not suppressed. The store port leaves the set change bit pending state upon receipt of a signal from the main system controller that the store operation is complete. It is also exited when a store request is suppressed by an instruction unit signal "cancel all".

The interlocked update state indicates that the request is an interlocked update so that a line present to line missing transition is not allowed. If the request is line present, the cache controller will abort any move-out to the request line and this state is entered upon allocation of the store port to a given line.

The suppressed state signifies that the corresponding store is to be suppressed. The state can be entered upon allocation from a length-0 store or update. Further, it can be entered upon receipt of a store suppress signal from the instruction unit.

4. Main Store Controller Store Port Support

Figure 5:
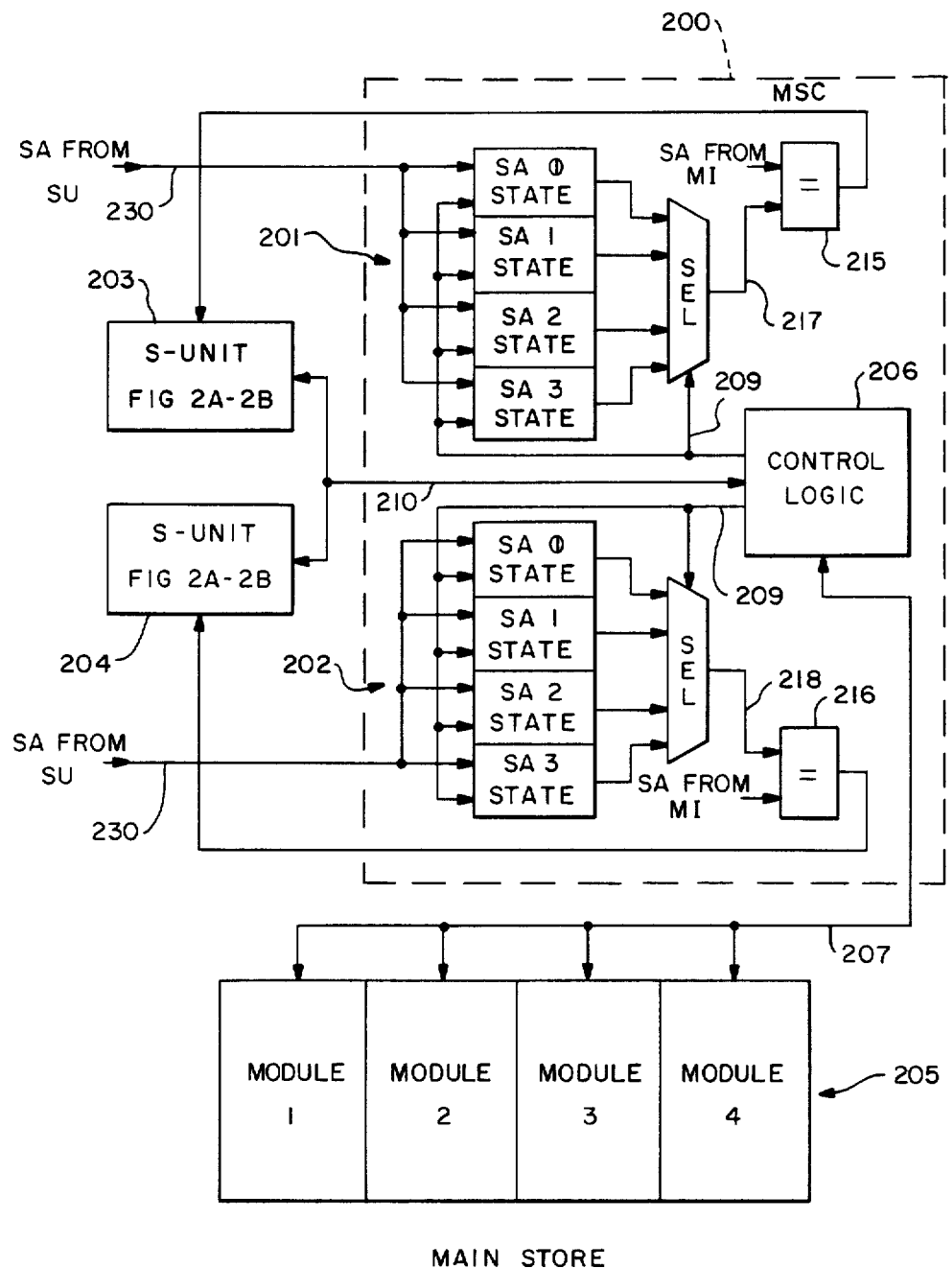
FIG. 5 is a block diagram of a main store controller for use with the embodiment of FIGS. 2A and 2B.

FIG. 5 illustrates the configuration of a main store controller MSC 200 in the preferred embodiment of the present invention. The system according to the present invention can be implemented in a dual processing or multiprocessing configuration in which a plurality of storage units such as illustrated in FIGS. 2A and 2B can be coupled to a single main store controller 200 and main store 205. In the configuration illustrated in FIG. 5, there are two storage units 203, 204 in a dual processing configuration. The main store 205 includes a plurality of main store modules (1, 2, 3, 4 in FIG. 5) each in communication with control logic 206 in the main store controller 200 across line 207.

The main store controller 200 has two groups 201, 202 of four registers, one group supporting each store unit S-UNIT 203, 204 in a dual processing configuration. Each group of registers 201, 202 corresponds with a store queue in a single S-UNIT 203, 204, one register for each store port in the store queue. The groups of registers 201, 202 on the main store controller 200 provide four functions. One function is to provide storage for the system address SA of results held in corresponding store ports in the S-UNIT. A second function is to provide state machines to implement the main store controller's 200 portion of set change bit operations. Another function is to provide match logic to do the store system address match on move-ins and store retries. The final function of the store ports is to inject system address into S-UNIT store retry requests.

The system address used by the cache controller store ports is stored on the main store controller 200. The system address is loaded across line 230 from the S-UNIT into the MSC store ports 201, 202 using the "load store port" signal sent to the main store controller 200 during the R-cycle of the cache controller's store flow. The MSC is not involved in the loading of the system address. The system address is read out of the main store controller store ports using a store port identifier supplied by the control logic 206.

Each register on the main store controller 200 has a write flow state machine associated with it in the control logic 206. The state machine controls set change bit operations. Viewed over time, each register's state machine works in a sequential fashion. The cache controller controls the initiation of these machines by issuing a "write store port" signal to the main store controller.

The S-UNIT write flow sends the main store controller R-cycle "write flow" and "do SCB". "Do SCB" tells the write state machine whether to do a set change bit SCB operation or not. When the SCB operation completes, the system controller sends the cache controller "store operation complete".

The move-in store match function is under main store controller control. When a line is being moved into a cache or a system address is being returned to the S-UNIT via the store retry function, its system address is compared with the system addresses of that S-UNIT's store ports from the corresponding register in the main store controller. If a match is found and the matching port is valid and line not present, the corresponding cache controller store port can be changed to line present during the move-in flow. The cache controller tells the main store controller which of its ports are valid, the match is done, and the main store controller tells the cache controller which valid ports matched the move-in system address.

The store retry function requires both cache controller and main store controller participation. When a cache controller store port goes line not present, the cache controller will issue a store retry request to the main store controller (this is a regular S-UNIT request minus the system address). The main store controller must select the system address from the register corresponding to the correct store port and all other information is supplied from the cache controller.

The registers for store port control communicate with the cache controller through the control logic 206 across line 209. The cache controller controls the loading of the registers, initiates requests, and issues store retry requests to the main store controller on line 210. The main store control logic 206 sends the cache controller a "store operation complete" signal when an SCB flow finishes. The main store controller 200 includes the move-in match logic 215 and 216 for each of the S-UNITS 203, 204, respectively. The systems address from the registers in group 201 and 202 is supplied over lines 217 and 218, respectively, for comparison with a move-in systems address from the corresponding S-UNIT. The registers send the control logic 206 a priority request signal and receive back a grant signal. The control logic 206 sends the registers the control signals to do the move-in store match function.

SCB requests from the registers in groups 201, 202 to the control logic 206 are controlled by both top of queue TOQ pointers and the write state machines. After the cache controller has sent an SCB request to the write state machine, that request waits in a respective first-in, first-out FIFO queue until it is TOQ. After an SCB request becomes TOQ, it may begin requesting priority to the control logic 206 so the request may be loaded into the main store controller ports. At the same time a request is sent to the control logic 206, it is also sent to a store port request latency timer. The latency timer pipes the store port requests so that they can be compared with the control logic 206 signal "store port grant" to generate a final grant or no grant signal. "Store port grant" means the store port received priority through the control logic 206. The priority within the store ports if multiple requests occur at the same time is, from highest to lowest priority, SCB and store retry (store retry is the default request).

The TOQ pointers for the SCB queues cycle through the four store ports as requests are made by the cache controller and as requests are granted by the control logic 206. The SCB TOQ pointer is incremented when the SCB TOQ register receives grant for a SCB request, or when the SCB TOQ register does not have a SCB pending.

The write state machine shown in FIG. 6 controls the SCB function for the main store controller 200. There is a state machine for each register in the groups 201, 202 corresponding to a store port on an S-UNIT. Each machine has four states: IDLE 601, NOT SCB 602, SCB 603, and PRIO 604.

The IDLE state 601 means that the corresponding store port contains no SCB request. This state 601 is entered if the current state is NOT SCB 602 and the port is SCB TOQ (605) or if the current state is PRIO and the port is SCB TOQ and has gotten grant from main store control logic (606). The IDLE state 601 is left if the port receives the "write store port" signal. The "do SCB" signal determines which state is entered: if "do SCB" is not asserted (607) then the next state is NOT SCB 602; if "do SCB" is asserted then the next state is SCB 603.

The NOT SCB state 602 means the cache controller is doing a write flow for this port but the flow is not a SCB operation. This state is entered if the port is in the IDLE state, "write store port" is asserted, and "do SCB" is not asserted (607). The NOT SCB state 602 will transition to IDLE when the port is SCB TOQ (605).

The SCB state 603 means the cache controller has sent the main store controller a SCB request and that request is waiting in the SCB queue. This state 603 is entered if the port is in the IDLE state 601 and both "write store port" and "do SCB" are asserted (608). The SCB state will transition to the PRIO state when the port is SCB TOQ (609).

The PRIO state 604 means the port has become SCB TOQ and is waiting to receive priority. The PRIO state 604 is entered when a port is in the SCB state 603 and becomes SCB TOQ (609). The PRIO state 604 will transition to the SCB state 603 if grant is not received (610). The PRIO state 604 will transition to the IDLE state 601 if the port is SCB TOQ and grant is received (606).

5. Store Retry

A means for guaranteeing that a move-in will eventually be done for a line missing store port is included in the preferred embodiment called the store retry mechanism within the cache controller 120 and main store controller MSC. When a store port SP, after waiting in line missing for main store controller latency, observes that its main store module is not busy, it concludes that its last move-in or store retry request has not been serviced and requests priority for a store retry pipe flow. The store retry flow sends a message to main store controller MSC requesting a system address return flow. The main store controller MSC must get involved with this because cache controller 120 does not have a copy of the store port's system address. After completing the store retry flow and waiting for system controller latency, the store port SP resumes its monitoring of the busy signals for its main store module, re-initiating a store retry if the module associated with its request is observed to be inactive while the store port is still line missing. Eventually, the main store controller MSC will accept a store retry request. It will raise the corresponding module busy signal and search all store ports' system addresses, recording those which match the system address SA of the store port SP which requested the store retry. A system address return flow is then issued to cache controller 120. The main store controller MSC indicates the requesting store port SP and returns its system address SA into the storage pipeline, and using an A-cycle move-in-match mask indicates all store ports SP which match this system address. The results of a special store retry match (using the system address SA supplied by main store controller MSC and the requesting store port's effective address supplied by cache controller 120) cause the cache controller R+1-cycle to either transition all indicated store ports SP into line present if the line was found in the cache 118, or else request a move-in and leave the store ports in line missing.

For performance reasons, it is desirable for cache controller 120 to inhibit priority for any store retry requests to main store controller MSC between the time when a main store module busy signal goes inactive as a result of a system address return, and the R+1-cycle of the system address return.

6. Main Store Controller Latency and Store Port State Transitions

It must guaranteed that a store port SP cannot be freed and re-allocated between the time when the cache controller 120 tells the main store controller MSC which store ports are line missing and when main store controller MSC consequently asserts the A-cycle move-in-match mask. If such a re-allocation occurs, the new write request may falsely transition from line missing to line present state. For similar reasons, a store port SP must not be freed and re-allocated between the time when a store retry request is accepted by main store controller MSC and the R-cycle of the resulting system address return flow. The following rules prevent either occurrence:

a. The only legal store port state transitions are the following:
  i. A line missing store port must become line present before it can be freed and re-allocated. There are no cancels for store ports.
  ii. Only a move-in or system address return can transition a line missing store port into line present state.
b. The main store controller will service move-in and store retry requests serially for a given main store module, using the main store controller's module busy signals for synchronization. A new request is not accepted by MSC until any previously accepted requests for that module have completed.

7. Move-out Interference With Writes

To insure system data integrity, two conditions must be met with respect to writes:

a. No write may be done to an invalid line
b. A modified line may only be moved out by a long-move-out (LMO).

Latency within the cache controller pipeline, and in interaction between cache controller 120 and main store controller MSC, causes problems in meeting these conditions. A move-out may invalidate a line which has a write request pending in a store port SP. In this case, the store port state must be changed from line present to line missing before the write flow enters the pipe. This is done in the R-cycle of the move-out flow(s), using a variation of the store fetch interlock SFI match logic. Writes enter the pipe in the P-cycle; however, the R-P latency between the setting and use of the store port state has potential exposures. If the move-out is long and the four LMO flows are required to be consecutive, the hole between the first move-out R-cycle and the first possible write P-cycle is covered by the remaining LMO flows. If the Move-out is short (SMO), a write flow could possibly write an invalidated line.

The above exposure may be covered by attempting to prohibit SMO's of lines which have a pending write request. This can be accomplished in the following two ways:

All data integrity move-outs of private or modified lines are LMO's

Replacement logic checks the store ports (using a variation of SFI match) in the B-cycle of a flow which generates a swap move-out request and requests a LMO of a matching line regardless of whether the line was modified.

This last item is not 100% effective due to the indeterminate amount of latency between a cache controller move-out request and the actual move-out flow(s) done by main store controller. A store port may be allocated after a SMO request is issued, then the SMO can invalidate the line before the write occurs (condition 1 is violated by the write). In addition, a store port may be allocated and do a write, all between the time of a SMO request and the actual SMO (condition 2 is violated by the SMO). In an attempt to prevent these problems, cache controller sends a signal to main store controller in the B-cycle of any store or update flow telling the main store controller that a store port has the potential to be allocated. Main store controller then changes any pending swap SMO's of private lines to LMO's. Starting with the R+2-cycle of the potential store port allocation, the P-cycle will see no SMO's which had been requested by the cache controller R+1-cycle during or before that potential store port allocate. Since the last possible interfering SMO from system controller gets to the P-cycle in the R+1-cycle of a potential store port allocation, and the earliest possible write from that store request also gets to the P-cycle in that same R+1-cycle (the I-Unit W-cycle), and since a SMO always has priority over a write, there is no possibility of the line being modified before a SMO; hence condition 2 is satisfied. Condition 1 is met by inhibiting write priority during P-cycles which line up with the A- or B-cycles of SMO's and with the R+1-, R+2-, or R+3-cycles of a store port allocation (any P-cycle write before the R+1-cycle is too early to belong to the newly-allocated store request, and any after the R+3-cycle is too late to be in the A- or B-cycle of a SMO which should have been changed to a LMO).

CONCLUSION

As described in detail above, by use of the store queue taught by the present invention, the priority of a storage pipeline write flow can be greatly decreased since data no longer comes directly from the 8-byte result register. This allows other storage requests to complete more quickly and lowers the overall cache contention problem in a high speed data processing machine, increasing throughput. Further, with the store queue, data from the execution units result register is merely transferred to the next free store queue register rather than directly into the cache. If the target line is not resident in the cache, the store queue takes care of getting the line brought in from main memory. The instruction unit, therefore, does not need to interlock waiting for the move-in and will not see this overhead. Further, the store queue register has a width a multiple of the number of bytes of the result register. Consequently, the number of storage pipeline write flows is greatly decreased for long store operations. This results in a corresponding increase in bandwidth of stores to cache.

The invention has been described with reference to a particular embodiment. Those skilled in the art will recognize that many variations and modifications of the embodiment described can be made that fall within the spirit of the invention. The scope of the invention is meant to be defined by the following claims.

What is claimed is:

1. In a data processing machine having a first unit for execution of instructions and a second unit for storing data supplied from a plurality of ports, the first unit executing instructions in a first pipeline including an addressing stage having means for supplying addresses for results to be generated in the first pipeline according to a given instruction and a subsequent result posting stage having means for supplying a result generated in the first pipeline according to the given instruction, the second unit storing data in locations identified by addresses in response to operations in a second pipeline including an address selecting stage, having means for selecting an address for an operation in the second pipeline from one of the plurality of ports or from the means for supplying addresses in the first unit, and a subsequent result posting stage, having means for posting results of operations in the second pipeline; an improvement comprising:

a plurality of store port means, connected to the first unit and to the second unit, for porting results and addresses received from the first unit to the second unit for storage of the results in the second unit, each of the plurality of store port means including means for storing a result generated in the first pipeline and a corresponding address for the result; and control means, in communication with the first unit, the second unit, and the plurality of store port means, and responsive to an address from the means, in the first pipeline, for supplying addresses selected during the address selecting stage of the second pipeline, for allocating one of the plurality of store port means during the result posting stage of the second pipeline to receive the result from the first pipeline during the result posting stage of the first pipeline.

2. The apparatus of claim 1, wherein the machine includes a main storage system and the second unit includes a high speed cache in communication with the main storage system, the high speed cache storing lines of data from the main storage system for quick access by the first unit; the apparatus further including:

means, in communication with the means, in the first pipeline, for supplying addresses and with the second unit, for determining whether a result in a given one of the plurality of store port means resides in a line from the main storage system that is present in the high speed cache or missing from the high speed cache; and means, responsive to a determination that a result resides in a missing line, for causing the missing line to be moved into the high speed cache.

3. The apparatus of claim 2, further including means, responsive to a move-in of a line, for initiating a transfer of the results from one of the plurality of store port means to the high speed cache.

4. The apparatus of claim 2, wherein the main storage system includes means for storing a change identifier with each page of data, each page including a plurality of lines of data, in the main storage system indicating changes to the page, the control means further including:

means for generating a set change identifier signal in response to the storage of a result from one of the plurality of store port means to the high speed cache;

means, in communication with the main storage system and the control means and responsive to the set change identifier signal, for setting the change identifier on a page corresponding to the result from the one store port means; and means, responsive to the change identifier for a given page for causing the second unit to move a line from the high speed cache to the main storage system to update the given page.

5. The apparatus of claim 2, wherein the plurality of ports includes at least one port from which a request to fetch a line of data from the high speed cache is initiated; the apparatus further including:

means for comparing an address of a fetch from at least one port with addresses stored in the plurality of store port means;

means responsive to a match for disabling the fetch pending a transfer of results in the plurality of store port means having a matching address to the high speed cache.

6. The apparatus of claim 2, wherein the address stored in the plurality of store port means includes a system address portion necessary for accessing a line in the main storage system and an effective address portion necessary for accessing the line in the high speed cache and wherein the control means further includes means in communication with the main storage system for storing the system address portion of the address information for each of the plurality of registers.

7. The apparatus of claim 2, wherein each of the plurality of store port means further includes a control field for storing a state indicator, the state indicator indicating a free state, a data-ready state, or data-not-ready state for the corresponding store port means, and the control means further including:

means, coupled to the first unit, to the means for determining and to the control fields of the plurality of store port means, for allocating a store port means in the free state to receive the result from the first pipeline, and if the line is present in the cache, updating the state indicator to indicate the data-ready state or if the line is missing from the cache, updating the state indicator to indicate the data-not-ready state.

8. The apparatus of claim 7, further including means responsive to a store port means in the data-not-ready state for causing the missing line to be moved in from the main storage system; and means, responsive to a move-in of the missing line, for updating the state indicator of the store port means to indicate a data-ready state.

9. The apparatus of claim 8, further including means, connected to the means for selecting addresses in the second pipeline, and responsive to a store port means in the data-ready state, for enabling selection of the store port means as a port to the second unit.

10. The apparatus of claim 1, wherein the control means further includes:

means for maintaining a first-in, first-out queue for the plurality of store port means identifying a sequence in which the plurality of store port means receive results from the first unit; and the control means being responsive to the queue for allocating one of the plurality of store port means.

11. The apparatus of claim 1, wherein the result supplied by the means for supplying a result includes up to a number N bits of data, and each of the plurality of store port means is capable of storing up to a multiple M times N bits so that more than one result can be stored in each of the plurality of store port means.

12. In a pipeline data processing machine having a first unit for execution of instructions running according to a first pipeline, a second unit including a high speed for storing data from a plurality of ports running according to a second pipeline, and a main store, the high speed cache storing lines of data from the main store for quick access by the first unit, the first unit having a result register for holding results of the flow of the first pipeline and means for supplying addresses for the results, an apparatus for transferring the results in the result register to the high speed cache, comprising:

a plurality of registers connected to receive results and addresses for the results from the first unit, and to supply the results and addresses to the high speed cache, each of the plurality of registers including means, responsive to a flow of the first pipeline for storing the result and addresses; and control means, in communication with the second unit and the plurality of registers, responsive to a flow of the second pipeline for selecting one of the registers as a port to the second unit; wherein the plurality of ports includes at least one port from which a request to fetch a line of data from the high speed cache is initiated; and further including means for comparing an address of a fetch from the at least one port with addresses stored in the plurality of registers; and means responsive to a match for disabling the fetch pending a transfer of results in the plurality of registers having a matching address to the high speed cache.

* * * * *

UNITED STATES PATENT AND TRADEMARK OFFICE
CERTIFICATE OF CORRECTION

PATENT NO. : 4,872,111

DATED : October 3, 1989

INVENTOR(S) : Daberkow, et al

It is certified that error appears in the above-identified patent and that said Letters Patent is hereby corrected as shown below:

Col. 7, line 18, after "A.write," , is "SCBending/;", should be
--SCB.Pending; --

Col. 7, line 21, after "change bit pending", is "(SCBending/;",
should be -- SCB.Pending; --

Col. 8, line 43, is "SCBending/ ;" should be --SCB pending;--

Signed and Sealed this

Fourth Day of June, 1991

*Attest:*

HARRY F. MANBECK, JR.

*Attesting Officer*    *Commissioner of Patents and Trademarks*

UNITED STATES PATENT AND TRADEMARK OFFICE
CERTIFICATE OF CORRECTION

PATENT NO. : 4,872,111

DATED     : October 3, 1989

INVENTOR(S) : Kevin L. Daberkow et al

It is certified that error appears in the above-identified patent and that said Letters Patent is hereby corrected as shown below:

On the title page, item [54] and in column 1, lines 1-4:

Title is "MONOLITHIC SEMI-
CUSTOM IC HAVING STANDARD
LSI SECTIONS AND COUPLING
GATE ARRAY SECTIONS" should
read "CACHE STORAGE QUEUE"

Signed and Sealed this

Twentieth Day of October, 1992

Attest:

DOUGLAS B. COMER

*Attesting Officer*     *Acting Commissioner of Patents and Trademarks*